(12) United States Patent
Blandin et al.

(10) Patent No.: US 7,766,496 B2
(45) Date of Patent: Aug. 3, 2010

(54) COMPACT LIGHTING DEVICE FULFILLING A BENDING LIGHT FUNCTION

(75) Inventors: Jonathan Blandin, Les Pavillons Sous Bois (FR); Etienne Pauty, Paris (FR); Benoît Reiss, Eaubonne (FR); Vanesa Sanchez, Paris (FR)

(73) Assignee: Valeo Vision, Bobigny (FR)

( * ) Notice: Subject to any disclaimer, the term of this patent is extended or adjusted under 35 U.S.C. 154(b) by 181 days.

(21) Appl. No.: 12/101,270

(22) Filed: Apr. 11, 2008

(65) Prior Publication Data
US 2008/0253143 A1 Oct. 16, 2008

(30) Foreign Application Priority Data
Apr. 13, 2007 (FR) .................................. 07 02705

(51) Int. Cl.
*F21V 33/00* (2006.01)
(52) U.S. Cl. .................. 362/41; 362/465; 362/543; 362/538; 362/539; 362/523
(58) Field of Classification Search ......... 362/465–468, 362/41, 43, 512, 543, 538, 539, 523, 525
See application file for complete search history.

(56) References Cited

U.S. PATENT DOCUMENTS

| 5,436,807 | A | * | 7/1995 | Kobayashi | .................. 362/41 |
| 5,567,032 | A | * | 10/1996 | Heizmann | .................... 362/37 |
| 6,176,590 | B1 | | 1/2001 | Prevost et al. | |
| 6,908,207 | B2 | * | 6/2005 | Jeannot | ........................ 362/37 |
| 7,252,417 | B2 | | 8/2007 | Ravier | |
| 7,280,901 | B2 | | 10/2007 | Dubrovin et al. | |
| 2001/0028565 | A1 | | 10/2001 | Ishida | |
| 2004/0085201 | A1 | | 5/2004 | Dubrovin et al. | |
| 2005/0018436 | A1 | | 1/2005 | Leleve | |
| 2005/0047153 | A1 | | 3/2005 | Ravier | |
| 2005/0219856 | A1 | * | 10/2005 | Tatsukawa | .................. 362/507 |
| 2006/0133104 | A1 | | 6/2006 | Okubo et al. | |
| 2007/0183168 | A1 | | 8/2007 | Naganawa et al. | |
| 2009/0080210 | A1 | | 3/2009 | Reiners et al. | |

FOREIGN PATENT DOCUMENTS

| CA | 2603062 A1 | 10/2006 |
| DE | 102005014754 A1 | 10/2006 |
| EP | 0864462 A1 | 9/1998 |
| EP | 1502814 A1 | 2/2005 |
| EP | 1669665 A2 | 6/2006 |
| EP | 1762431 A1 | 3/2007 |
| EP | 1818601 A1 | 8/2007 |
| FR | 2846609 A1 | 5/2004 |
| FR | 2857921 A1 | 1/2005 |
| GB | 2395548 A | 5/2004 |
| JP | 2001001832 A | 1/2001 |
| JP | 2003200779 A | 7/2003 |

\* cited by examiner

*Primary Examiner*—Laura Tso
(74) *Attorney, Agent, or Firm*—Jacox, Meckstroth & Jenkins

(57) ABSTRACT

A lighting device for a motor vehicle producing a global light beam, the lighting device comprising a first fixed optical module comprising at least one first light source for producing a first light beam of the type consisting of a light beam with a substantially flat and horizontal cutoff. The lighting device also comprises a second movable optical module comprising at least one first light source for producing a second light beam of the type consisting of a light beam with non-flat cutoff able to be moved with respect to the first light beam.

27 Claims, 3 Drawing Sheets

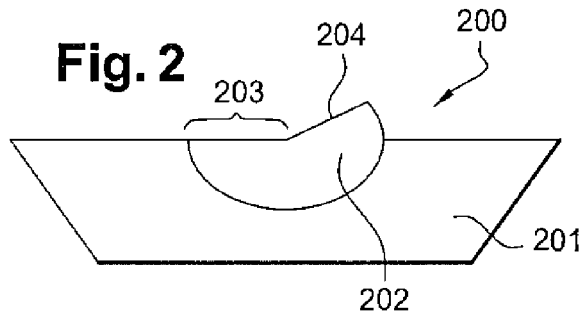
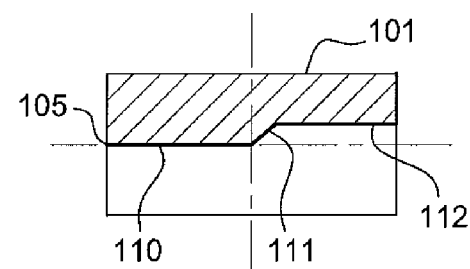
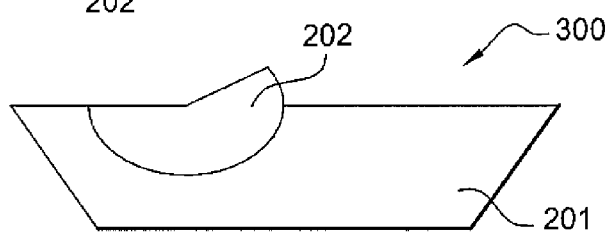
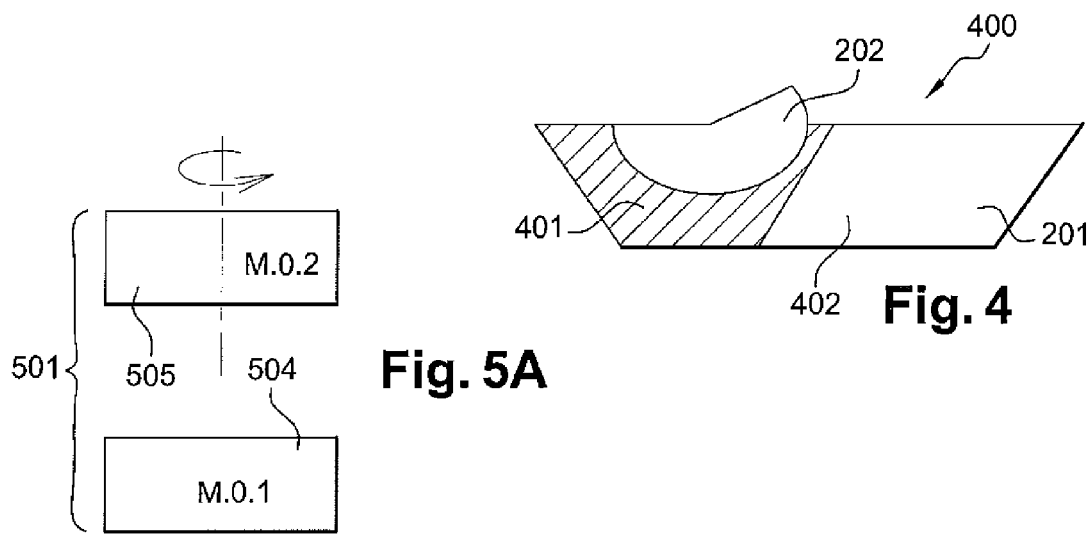
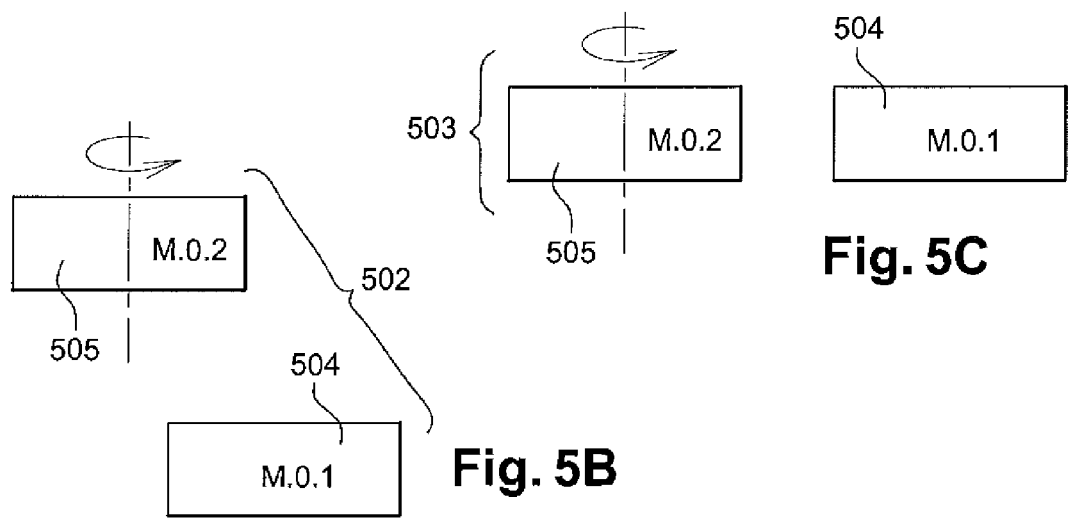

COMPACT LIGHTING DEVICE FULFILLING A BENDING LIGHT FUNCTION

BACKGROUND OF THE INVENTION

1. Field of the Invention

The field of the invention is in general terms, that of motor vehicle headlights.

2. Description of the Related Art

In this field, various types of light or lighting devices are known, among which there are:

- side lights, with low intensity and range;
- high beam lights, and auxiliary lights of the long range type, where the area of vision on the road is around 200 meters, and which must be switched off when passing another vehicle in order not to dazzle its driver; these are beams without cutoff;
- improved headlights, referred to as dual function, which combine the functions of dipped lights and high-beam lights by incorporating a removable screen;
- fog lights;
- and, more particularly relating to the invention, low beams or dipped lights, of high intensity and a range on the road of around 70 meters, which are used essentially at night and where the distribution of the light beam, with generally a V-shaped cutoff, is such that it makes it possible not to dazzle the driver of a vehicle being passed.

FIG. 1 depicts schematically a projection 101 onto a vertical plane of the light being produced by a lighting device of the low beam type. The flat projection surface is disposed facing the lighting device in question, perpendicular to its optical axis. The hatched part of the projection corresponds to an absence of light in this part, the part left white corresponding to a normal illumination by means of the lighting device in question.

The projection 101 has a non-flat cutoff line 105, essentially consisting of a low horizontal part 110, followed by a step 111, consisting of an oblique segment at the projection of the optical axis, and then a high horizontal part 112. Such a configuration make it possible not to dazzle the drivers being passed, to the left in the example in question, whilst providing optimum lighting on the right of the road.

In general terms, a cutoff line is a limit illumination line above which illuminating the road is prohibited. In countries with right hand traffic, this cutoff line is horizontal over the entire width of the road and on the left-hand verge of the road; it forms for example an angle of 15° above the horizontal, on the right-hand verge of the road. Its role is to prevent the vehicle lighting dazzling a driver in a vehicle in the opposite direction or the vehicle preceding it. The remainder of the document is illustrated by means of examples applicable to right hand traffic. The various examples described are of course directly transposable to conditions with left hand traffic.

There exist two main families of optical modules, which correspond to two distinct arrangements of the optical modules and which are able to participate in the lighting device according to the invention. Optical module means an optical system comprising at least one light source, for example one or more light emitting diodes grouped together, or a halogen or xenon lamp, possibly disposed in a reflector, and which is preferably "autonomous", that is to say which is able to be switched on or off separately from the other optical modules of the lighting device in which it is installed.

The two main families of optical module are as follows:

The first family is that of so-called elliptical optical modules. In this type of light, a light concentration spot is generated by a light source disposed in a mirror. Typically, the light source is disposed at the first focus of an ellipsoidal shaped mirror, the spot forming at the second focus of the mirror. The light concentration spot is then projected onto the road by a convergent lens, for example a lens of the plano-convex type.

The second family is that of so-called reflection optical modules with a complex surface or a parabolic surface. In this type of optical module, a light beam is generated by a light source of small size disposed in a reflector, or mirror. The projection onto the road of the light rays reflected by a suitable reflector makes it possible to directly obtain a light beam complying with the various constraints imposed by standards. This family of optical module includes so-called free-surface, or complex-surface, lights, that make it possible to directly obtain a light beam having a required cutoff line.

As specified subsequently, the lighting device according to the invention involves optical modules that may belong equally well to the first family or to the second family.

The conventional lighting devices that have just been mentioned, more particularly those that are used as dipped lights, produce light beams that are open to improvement when they are used under certain conditions. Thus, for example, when a vehicle is entering a bend, the headlights continue to illuminate straight in front of them whereas it would be more judicious to orient the light beams in the direction of the bend being taken. This is why, in addition to the conventional main headlight functions, in particular dipped and main beam, various improvements have gradually appeared.

Thus elaborate functions have been seen, referred to as advanced functions, or AFS ("Advanced Front Lighting System" in English, meaning advanced front lighting system), among which there are in particular a so-called "Town Light" in English, meaning town light, which provides the broadening of a beam of the dipped type while slightly reducing its range; a so-called "Motorway Light" function in English, meaning motorway light, which provides an increase in the range of a dipped light; a so-called AWL ("Adverse Weather Light" in English, meaning adverse weather light), which provides a modification of a dipped light beam for preventing any dazzling through a reflection of its own headlight.

In functions of the AFS type, there are also found, directly relating to the invention, a so called DBL function ("Dynamic Bending Light" in English, meaning movable bending light, called code virage in French), which produces an orientable headlight, also referred to as a movable beam lighting device: such a lighting device is able to modify the orientation of a light beam produced by a lighting device, so that, when the vehicle is entering a bend, the road is illuminated in an optimum fashion, following the geometry of the road.

In order to fulfill such a function, a first known technique consists of making the global beam of the lighting device movable by virtue of an actuator controlling the pivoting of the lighting device in its entirety according to information coming from the vehicle, for example by means of a steering-wheel angle sensor. An articulated lighting device is then spoken of. An example of implementation of this first technique is described in the patent FR 2 846 609, which is equivalent to U.S. Pat. No. 7,280,901.

A second technique, such as the one described in the patent application FR 2 857 921, which is equivalent to U.S. Patent Publication 2005/0018436, consists of a fixed light projecting device comprising a plurality of light sources, and means for controlling a successive switching on of supplementary light sources, the successive switching on of the sources depending on the path of the vehicle so as to provide an effect of light sweep towards the inside of the bend being entered.

The second technique is today essentially used with light emitting diodes. This is because such light sources are more and more being used in lighting devices, which take advantage of several properties of light emitting diodes:

first of all, for a long time, it has been know that light emitting diodes do not radiate omnidirectionally but radiate in a half-space opposite to the substrate that supports its p-n junction; thus, by using a more directive radiation than halogen or discharge lamps, the quantity of energy lost is less. The diodes consume less energy, even at equal intensity of radiation, than discharge lamps or halogen lamps.

next, these diodes were recently improved in terms of radiation intensity; they can now radiate a flux of at least 100 lumens. The quantity of heat that they give off is however limited, and a certain number of constraints, relating to the dissipation of heat in the lighting devices using other types of light source, disappear.

in addition, they emit radiation, for a long time in the red range but now also in white; in addition, they are compact, and their particular shape offers novel possibilities for producing and arranging the complex surfaces that are associated with them. They make it possible to work the style of the lighting devices by facilitating the creation of original shapes.

However, in the second technique mentioned for fulfilling DBL functions, in particular by using light emitting diodes as supplementary light sources, the size of such a lighting device is very great, in particular because of the number of LEDs that are added as supplementary light sources; in addition, such an addition makes this solution particularly expensive.

Moreover, in the first technique mentioned, because of the relatively low light intensity that the LEDs are capable of producing, it is necessary to arrange a large number of them within the lighting device. Making all the LEDs move in such a lighting device is then complicated in two ways: firstly, the bulk due to the movement mechanism and of the diodes themselves is maximum, and secondly the weight of the elements to be moved in order to make the light beam pivot is significant and gives rise to high play between the various elements involved in the movement.

SUMMARY OF THE INVENTION

The object of the present invention is a compact lighting device fulfilling a function of the bending light type. The aim of the invention is essentially to propose a solution for fulfilling various lighting functions, for example a function of the bending light type, by means of a lighting device whose size is limited, whatever the type of light source involved in the said lighting device, for example with light sources of the light emitting diode (LED) type.

The object of the invention also proposes a solution to the problems that have just been mentioned. In the invention, it is proposed to produce a lighting device able to fulfill a DBL function, in which the weight of the elements moving during the movement of the light beam fulfilling the DBL function, as well as the size of the lighting device overall, are limited, in particular when the light sources participating in the fulfillment of the DBL function are of the light emitting diode type. To this end, it is proposed, in the lighting device according to the invention, to dispose at least one first optical module, producing a substantially flat horizontal cutoff, and a second optical module producing a non-flat cutoff line, only the second optical module being able to move in order to fulfill the DBL function. Advantageously, the second module generates a light beam contributing essentially to producing the hot spot of the global light beam produced by the lighting device according to the invention.

In various embodiments, the lighting device according to the invention is able to produce variations in light intensity of various light sources, thus increasing the sensation of continuous movement of the light beam fulfilling the DBL function (or bending dipped function).

The invention therefore concerns essentially a lighting device for a motor vehicle producing a global light beam, the lighting device comprising:

a first fixed optical module comprising at least one first light source for producing a first light beam of the type consisting of a light beam with a substantially flat and horizontal cutoff;

a second movable optical module comprising at least one first light source for producing a second light beam of the type consisting of a light beam with non-flat cutoff able to be moved with respect to the first light beam.

Apart from the main characteristics that have just been mentioned in the previous paragraph, the lighting device according to the invention can have one or more additional characteristics among the following:

the light source or sources of the second optical module and/or the light source or sources of the first optical module is or are of the light emitting diode type;

the second optical module is able to make a rotation movement on an approximately vertical axis when the motor vehicle enters, or passes through, a bend, the rotation movement of the second optical module following the orientation of the bend;

the light intensity of the first light beam is able to increase when the motor vehicle enters, or passes through, a bend oriented on the side of the vehicle where the lighting device is disposed;

the light intensity of the first light beam is able to decrease when the motor vehicle enters, or passes through, a bend oriented on the side opposite to the side of the vehicle where the lighting device is disposed;

the first optical module comprises a plurality of light sources, the switching on or the increase in intensity of each of the light sources depending on the fact that the motor vehicle is entering, or passing through, a bend, progressively making the global light beam more luminous on the side corresponding to the orientation of the bend, when the orientation corresponds to the side of the vehicle where the lighting device is disposed;

the switching on or reduction in the intensity of each of the light sources of the first optical module depends on the fact that the motor vehicle is entering, or passing through, a bend, progressively making the global light beam less luminous on the side corresponding to the orientation of the bend, when this orientation corresponds to the side opposite to the side of the vehicle where the lighting device is disposed;

a first static light source producing a first hot spot in the global light beam, the first hot spot being oriented between the optical axis of the lighting device and the side corresponding to the external side of the lighting device, the first static light source being able to be switched on or to increase its light intensity when the vehicle enters, or passes through, a bend oriented on the side of the vehicle where the lighting device is disposed;

the first static light source is able to be switched off or to reduce its light intensity when the vehicle enters or passes through a bend oriented on the side opposite to the side of the vehicle where the lighting device is disposed;

the second optical module is able to be positioned according to at least two positions, a first position according to which the global beam corresponds to a dipped beam for traffic on the right and a second position in which the global beam corresponds to a dipped beam for traffic on the left;

the second optical module is able to be positioned so as to emit a light beam whose highest intensity zone is disposed along the optical axis of the lighting device and partly illuminating above the horizontal cutoff of the first light beam so as to contribute to generating a main beam;

the second optical module is able to fulfill a rotation movement along an approximately horizontal axis in order to contribute to generating a beam of the motorway light type;

the intensity of the second light beam can be modulated by increasing or decreasing;

the lighting device allows an increase in the intensity of the second light beam in parallel to the reduction in intensity of the first light beam, for a function of the bad weather light type;

the lighting device allows a reduction in the intensity of the second light beam in parallel to the increase in intensity of the first light beam, for a function of the town light type;

the second light beam contributes to the extent of at least forty percent of the total light intensity of the maximum intensity zone of the global light beam, preferentially to between sixty and eighty percent of the total light intensity of the maximum intensity zone of the global light beam;

variations in the intensity of the light source or sources of the first and/or second optical modules make it possible to generate the variations in respect of light intensities of the first light beam and second light beam.

All the additional characteristics of the lighting device according to the invention, in so far as they are not mutually exclusive, are combined according to all possibilities of association in order to end up with different example embodiments of the invention.

The present invention also relates to a motor vehicle equipped with a lighting device comprising the main characteristics, and possibly one or more supplementary characteristics, that have just been mentioned.

The present invention also relates to a method of implementing a lighting device comprising the main characteristics, and possibly one or more supplementary characteristics, thus that have just been mentioned or for implementing the vehicle mentioned in the previous paragraph.

The invention in its various applications will be understood better from a reading of the following description and an examination of the figures that accompany it.

BRIEF DESCRIPTION OF THE ACCOMPANYING DRAWINGS

These are presented only by way of indication and are in no way limitative of the invention. The figures show:

FIG. 1, already described, is a schematic representation of a cutoff line of a lighting device of the dipped beam type;

FIG. 2 is a schematic representation of a global light beam produced by a first example embodiment of a lighting device according to the invention when the motor vehicle is travelling in a straight line;

FIG. 3 is a schematic representation of a global light beam produced by the first example embodiment of the lighting device according to the invention when the motor vehicle is negotiating a bend to the left;

FIG. 4 is a schematic representation of a global light beam produced by a second example embodiment of a lighting device according to the invention when the motor vehicle is negotiating a bend to the left;

FIGS. 5A, 5B and 5C are various examples of an arrangement relating to various optical modules participating in the first and second examples of a lighting device according to the invention;

DETAILED DESCRIPTION OF THE PREFERRED EMBODIMENTS

Figure 6:
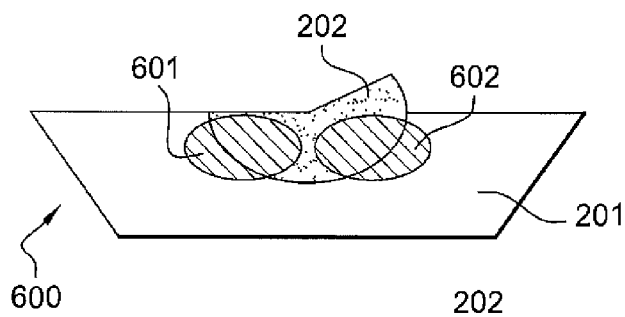
FIG. 6 is a schematic representation of a global light beam produced by two lighting devices of a third example embodiment of the lighting device according to the invention when the motor vehicle is travelling in a straight line.

The various elements appearing in several figures will, unless otherwise specified, have kept the same reference. The concepts of direction and position, of the "left", "right", "above" etc type, are mentioned under normal conditions of use of the examples of a lighting device according to the invention. The positions of the lights on the vehicle are in particular defined with respect to the point of view of the driver. The positions, light intensities or directions of the various elements or light beams, which are designated by the expression "reference", are those observed when the vehicle is travelling in a straight line.

FIG. 2 depicts schematically a projection of a global light beam 200 produced by a first example embodiment of a lighting device according to the invention. In more general terms, global light beam means the light beam produced by the lighting device in its totality, corresponding to the superimposition of the light beams produced by all the optical modules and possibly by supplementary light sources. As will be seen, the global light beam results systematically, in the invention, from the superimposition of at least two different light beams produced by at least two distinct optical modules.

In the example in FIG. 2, the global light beam 200 results from the superimposition of a first light beam 201 and second light beam 202. The first light beam 201 produces a horizontal cutoff. It is produced by a first optical module 504 (FIG. 5A), of the elliptical type or of the so-called reflection type (with a complex surface or a parabolic surface), numerous example embodiments of which are known in the prior art, making it possible to concentrate the lights solely in a horizontal cutoff line. The second light beam 202 produces a non-flat cutoff having, in this example, a horizontal segment 203 that is extended in an inclined part 204 inclined by approximately 15 degrees upwards with respect to the horizontal. The global form of the second light beam 202 corresponds to a light beam of the conventional dipped beam type. In other example embodiments, the cutoff angle can adopt values ranging approximately from 10 to 60 degrees.

In the example shown, the second light beam 202 is directed in the optical axis of the lighting device; such a configuration occurs, in the various example embodiments of the invention, when the vehicle is travelling in a straight line. The contribution of the second light beam 202 to the global light beam 200 makes it possible to obtain a hot spot, the contour of which corresponds substantially to that of the projection of the second light beam 202. A hot spot, also referred to as a light spot, is, in general terms, situated at the center of a halo of less intense light. Therefore the term "hot spot" is given to the area of maximum light intensity situated, at least when the vehicle is travelling in a straight line, at the center of a light beam, in the axis of the beam.

In various example embodiments, the contribution of the second light beam 202 to the hot spot of the optical axis of the lighting device in question is at least 40 percent of the total light intensity of the hot spot in question, and preferentially 60 to 80 percent of the total light intensity of the hot spot in question.

FIG. 3 repeats the elements of FIG. 2 but in a new arrangement corresponding to that observed when the vehicle is following a bend to the left. According to the invention, in such a case, the first light beam 201 does not move with respect to its reference position. On the other hand, according to the invention the second light beam 202 is offset to the left with respect to its reference position. In this way, a global light beam 300 is obtained, the hot spot of which is offset towards the left.

In general terms, it is proposed, in the invention, to offset the hot spot corresponding to the superimposition of the second light beam 202 on the first light beam 201 in a direction corresponding to the orientation of the bend being followed. The shifting to the left or right is carried out progressively, for example from so-called steering-wheel angle information measured by an adapted sensor.

The fact that only the second optical module 505, producing the light beam effecting the oblique cutoff in the cutoff line of the global light beam 300, changes in rotation makes it possible to preserve the continuous dynamic rendition of the DBL (or bending dipped) functions whilst limiting the number of light sources to be moved to produce such a dynamic rendition.

In order to increase the dynamic rendition in the movement of the global light beam 300, it is possible to also make the intensity of the light beam emitted by the first optical module 504 vary.

According to a first variant, the intensity of the light beam emitted by the first optical module 504 is able to increase when the motor vehicle is entering, or passing through, a bend oriented on the side of the vehicle where the lighting device is disposed. In this case, when the vehicle is equipped with two headlights of this type, one on the right and one on the left of the vehicle, the intensity of the beam emitted by the first optical module 504 of the right-hand headlight is increased, when the motor vehicle is entering, or passing through, a bend oriented to the right. When the motor vehicle is entering, or passing through, a bend oriented to the left it is on the other hand the intensity of the beam emitted by the first optical module 504 of the left-hand headlight that is increased.

The latter variant embodiment can be improved in a second variant, in which the light beam of the first light source of the first optical module 504 is able to decrease when the motor vehicle is entering, or passing through, a bend oriented on the side opposite to the side of the vehicle where the lighting device is disposed. In this case, in addition to the variations described in the previous paragraph, the intensity of the light beam emitted by the first optical module 504 of the left-hand headlight is decreased, when the motor vehicle is entering, or passing through, a bend oriented to the right. When the motor vehicle is entering, or passing through, a bend oriented to the left, the intensity of the beam emitted by the first optical module 504 of the right-hand headlight is increased.

In the following example embodiments of the invention, it is sought to improve further an impression of dynamic rendition in the movement of the global light beam 300, by modifying the light intensity of certain zones of the global light beam 300, in particular by increasing the light intensity in the zones situated on the same side as the bend being followed, and/or by reducing the light intensity of the zones situated on the opposite side to the bend.

Thus, in the example illustrated in FIG. 4, a global light beam 400 is created in which the light intensity of the first light beam 201 is increased in a left-hand part or zone 401 of the first light beam 201, a right-hand part or zone 402 of the first light beam 201 keeping its reference light intensity. This embodiment can be improved in a second variant, in which the light intensity of the first light beam 201 is reduced, in the right-hand part 402, with respect to its reference light intensity, in order to accentuate a little more the contrast between the zones 401 and 402. FIG. 4 depicts the use of a lighting device according to the present invention mounted on the left of the vehicle (from the point of view of the driver), when the vehicle is entering or passing through a bend oriented on the same side, that is to say a bend turning to the left.

In the context of a vehicle equipped with two lighting devices, left and right, as described in the previous paragraph, the dynamic rendition can also be improved with a device able to fulfill the function described previously and that consisting of reducing the intensity of the first light beam 201. Thus, when the vehicle is entering, or passing through, a bend oriented for example to the left, the left-hand headlight of the vehicle (from the point of view of the driver) will emit a global light beam 400 as described in the previous paragraph, and at the same time, in the right-hand headlight of the vehicle, the intensity of the first light beam 201 will be reduced.

Though FIG. 4 depicts a first light beam 201 in which the light intensity is modulated in two zones 401 and 402, it is nevertheless possible to produce a headlight comprising more than two zones in the first light beam 201. The modulation is then effected at each of the zones progressively according to the curve that the vehicle is following.

In practice, in order to obtain such variations in light intensity, the supply current to the various light sources of the first optical module 504 is made to vary. In certain example embodiments, supplementary dedicated light sources are used, which switch on only when the bend is entered, the switching on of these sources being progressive; for example, the supplementary light sources produce a light beam that give their contribution to the global light beam 400 essentially at the left or right ends of the global light beam 400.

FIGS. 5A, 5B and 5C show respectively first, second and third relative arrangements of a first optical module 504 and a second optical module 505, the relative arrangements being referenced respectively 501, 502 and 503. As illustrated, the first and second optical modules 504 and 505 can be disposed one above the other, one to the side of the other, or in a diagonal with respect to each other, the first two solutions, referenced 501 and 503, being favored for reasons of size. In the preferential embodiment depicted in these FIGS. 5A, 5B and 5C, the second optical module 505 is able to effect a rotation movement on an approximately vertical axis, thus enabling the functions described to be implemented.

Figure 7:
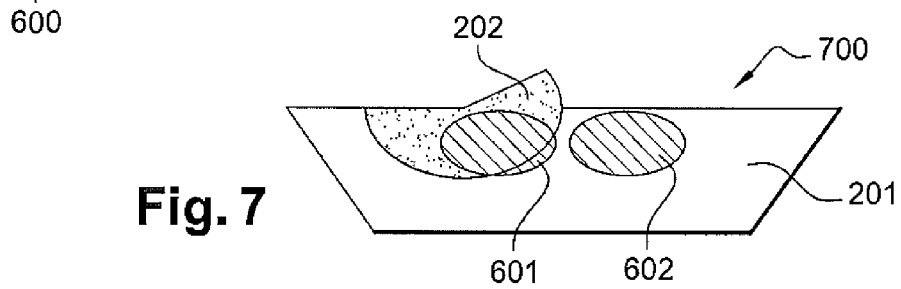
FIG. 7 is a schematic representation of a global light beam produced by the third example embodiment of a lighting device according to the invention when the motor vehicle is negotiating a bend to the left.
Figure 8:
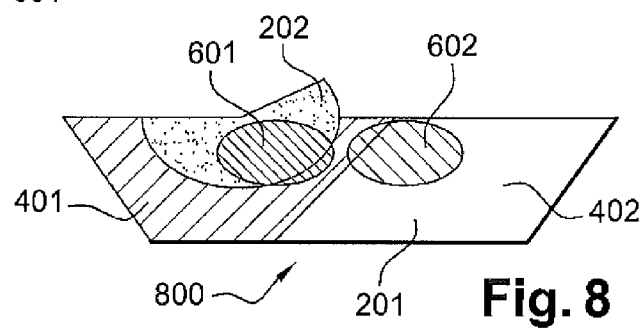
FIG. 8 is a schematic representation of a global light beam produced by a fourth example embodiment of a lighting device according to the invention when the motor vehicle is negotiating a bend to the left.

The examples shown in FIGS. 6, 7 and 8 correspond to the global beam resulting from the global light beams 600, 700 and 800 emitted by two headlights, right and left, of a vehicle. In each of these FIGS. 6, 7 and 8, each of the headlights emits a beam corresponding respectively to the examples in FIGS. 2, 3 and 4, to which a first hot spot 601 for the left-hand headlight and second hot spot 602 for the right-hand headlight have been added. As shown in this example and non-limitatively, each of the hot spots 601 and 602 are situated in the vicinity of the optical axis of the first optical module 504. Preferentially and as shown, each of the hot spots 601 and 602 are situated on the side of the optical axis corresponding to the side where the lighting device is situated in the vehicle, that is to say on the external side of the lighting device. That is to say, in the beam emitted by the left-hand headlight the hot spot 601 is situated to the left with respect to the center of the first light beam 201 emitted by the first optical module 504, while in the right-hand headlight the hot spot 602 is situated to the right. The hot spot of a lighting device is emitted by a static light source, for example a light emitting diode.

In the global light beam 600, resulting from the beams of the two headlights, there is therefore obtained a first hot spot 601 and a second hot spot 602 both disposed on each side of the center of the global light beam 600, close to it, and coming respectively from the left-hand headlight and the right-hand headlight.

In the global light beam 600 obtained when the vehicle is travelling in a straight line, the first and second hot spots 601 and 602 have identical reference light intensities. This makes it possible to vary the intensity to the right and left of the global light beam 600, depending on whether the vehicle is turning to the right or to the left. For example, when following a bend to the left, as is the case in FIGS. 7 and 8, the intensity of the first hot spot 601 to the left of the optical axis increases, and/or the intensity of the second hot spot 602 to the right of the optical axis decreases, in order to produce global light beams 700 and 800.

It should be noted that, instead of making the intensity of the static hot spot vary, it is also possible to illuminate the latter only when the vehicle is entering or passing through the bend. Likewise, the various possibilities of implementing a headlight with a hot spot can be combined with those described previously for the variations in the light intensity of the first light beam 201.

Figure 9A:
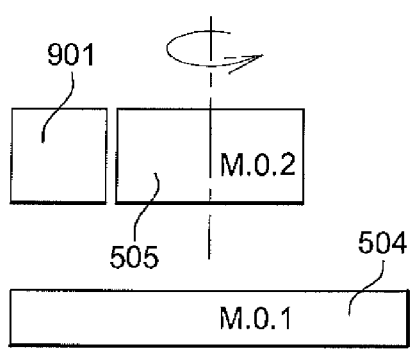
FIGS. 9A, 9B and 9C are various examples of an arrangement relating to various optical modules participating in the third and fourth examples of a lighting device according to the invention.
Figure 9B:
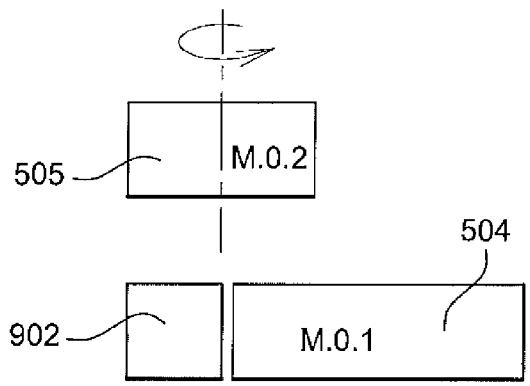
Figure 9C:
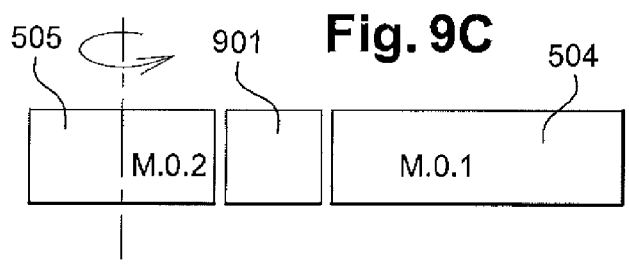

FIGS. 9A, 9B and 9C repeat the arrangements relating to the first optical module 504 and the second optical module 505 shown in FIGS. 5A, 5B and 5C, in which a static light source 901 or 902 has been disposed. In all cases, the static light sources 901 and 902 are disposed so as to make the lighting device as compact as possible.

Figure 10:
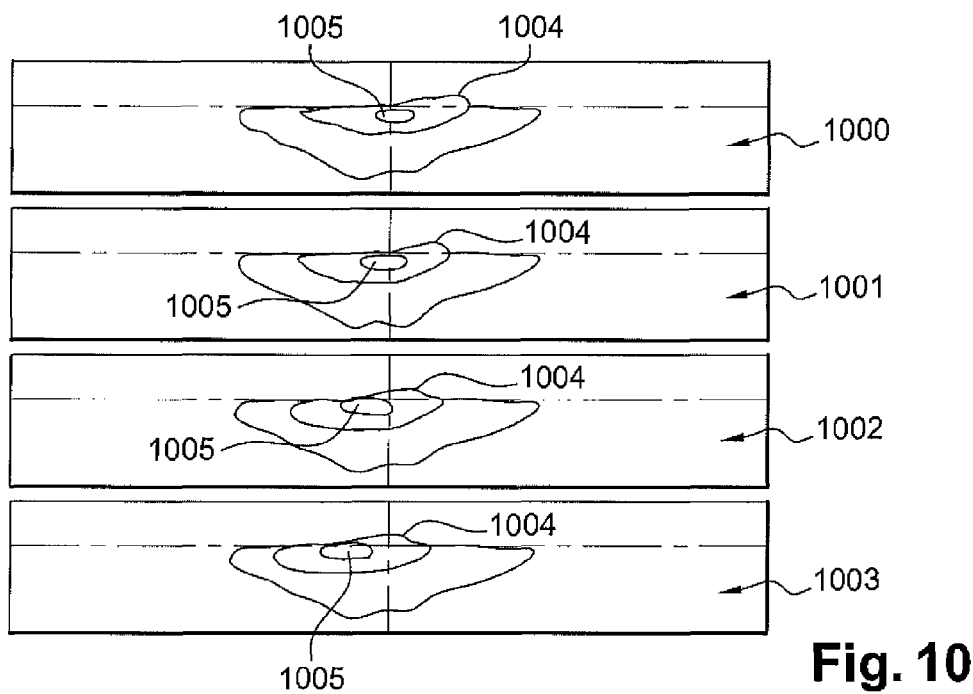
FIG. 10 shows various isolux curves illustrating the change (when the vehicle is taking a bend to the left), in the distribution of the light intensity of the global light being produced by the lighting device according to the invention.

FIG. 10 shows four iso-illumination diagrams, obtained with an example embodiment of a lighting device according to the invention, referenced respectively 1000, 1001, 1002 and 1003, and which correspond to a travel of the vehicle respectively in a straight line, on a bend to 5 degrees to the left, in a bend to 10 degrees to the left, and in a bend to 15 degrees to the left. Each of the iso-illumination diagrams 1000, 10001, 1002 and 1003 comprises, schematically, three iso-illumination curves, each iso-illumination curve being a closed curve the interior of which is formed by all the points of the global light beam where the light intensity is greater than the intensity of the points of the iso-illumination curve in question. In these figures, a progressive shift to the left of an oblique cutoff line 1004 is observed, and of a hot spot 1005 in accordance with the previously mentioned examples.

Figure 11:
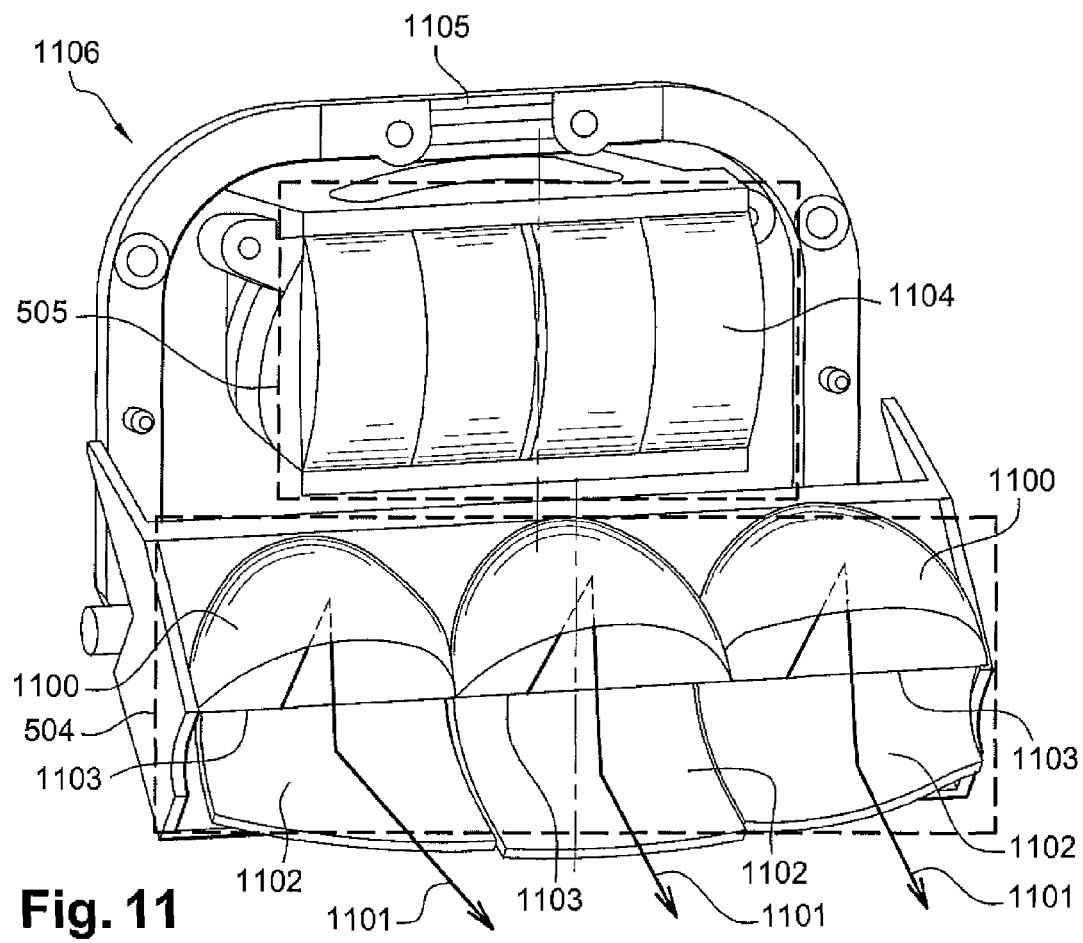
FIG. 11 is a detailed example of a lighting device according to the invention.

FIG. 11 is a particular example of a lighting device 1106 according to the invention. In the example shown, the first optical module 504, which is fixed, is of the complex surface type and the second optical module 505, which is movable, is of the elliptical type. The first optical module 504 comprises three reflectors in the form of a shell 1100. Each of these reflectors in the form of a shell 1100 forms a cavity. An LED is disposed inside each of these cavities. The light signals 1101 of the LEDs undergo a double reflection, first of all on an internal surface of the reflectors in the form of a shell 1100, then on a reflector 1102, one end 1103 of which, at the output of the cavities formed by the reflectors in the form of a shell 1100, makes it possible to produce the flat cutoff line. The second optical module 505 comprises two LEDs, each associated with a reflector (not shown) and disposed behind a lens 1104, the whole being articulated about a rotation axis 1105 set in movement by an actuator, not shown, for example according to information of the steering-wheel angle type.

In other alternative example embodiments, not shown, the movement of the second optical module 505 and/or the variations in intensity of the first optical module 504 are used to fulfill other functions then a dynamic illumination rendition in the bends.

In a first example embodiment, a lighting device according to a previously described embodiment can be used both for traffic on the right and for traffic on the left. For example, the neutral position, or "reference position", of the second optical module 505 can be adjusted according to two positions. For traffic on the right, the neutral position corresponds to the central position as shown in FIG. 2. For traffic on the left, the neutral position corresponds to a position of the second beam offset to the left, so that the left-hand side of the road above the horizontal cutoff of the first light beam 201 is illuminated and the global light beam 200 emitted has a horizontal flat cutoff on the right. In the FIG. 2, this would amount to moving the inclined part 204 to the left of the center of the first light beam 201, that is to say to the place occupied by the horizontal segment 203.

In the preferential embodiment, whether the neutral position be adjusted for traffic on the right or traffic on the left, the second optical module 505 can change with respect to this neutral position in order to fulfill the previously described dynamic lighting function.

In a second alternative example embodiment, the second optical module 505 is able to be positioned so as to emit a distribution beam substantially centered on each side of a vertical axis passing through the center of the optical axis of the second optical module 505 and partly illuminating above the horizontal cutoff of the first light beam 201 so as to contribute to generating a main beam. For example, compared with the representation in FIG. 2, the second light beam 202 will be moved horizontally so that the inclined part 204 is centered with respect to the horizontal cutoff of the first light beam 201.

According to a preferential embodiment of the second alternative example embodiment, the second optical module 505 can change with respect to this reference position in order to fulfill the dynamic lighting function in bends in main beam function. In the latter case, the second light beam 202 is also moved on the side of the bend, but in a more eccentric fashion than it would have been in order to produce a dipped beam of the type illuminating in the bend. The second light beam 202 will then be substantially centered on each side of the center of the road and partly illuminating above the horizontal cutoff of the first light beam 201.

In other alternative example embodiments that are not shown, the second light beam 202 is made to undergo the same types of variation in light intensity as those described for the first light beam 201. For example, the intensity of the second light beam 202 can be made to increase progressively when it is moved to the side for the rendition of a lighting function in the bend, this further reinforcing the rendition, in association or not with the variation in the first light beam 201. It is also possible to use the increase in intensity of the second light beam 202 in creating the function of the main beam type.

This variation in the intensity of the second movable beam also makes it possible to generate a function of the bad weather light type or a function of the town light type.

In the context of the bad weather light type function, the intensity of the second light beam 202 is increased and at the same time the intensity of the first light beam 201 is reduced.

In the context of the town light type function, the intensity of the second light beam 202 is reduced and at the same time the intensity of the first light beam 201 is increased. Preferentially, the lighting device can comprise an additional static light source for generating a static hot spot in the global light beam 200 and improving the beam-broadening effect compared with the dipped light.

The variation in intensity of the second optical module 505 being independent of its movement, a dynamic lighting rendition in the bends according to the town light type or bad weather light type.

In another embodiment the second optical module 505 is also able to effect a rotation movement on an approximately horizontal axis in order to contribute to generating a beam of the motorway light type. According to a preferential embodiment of this embodiment, the second optical module 505 can change with respect to the reference position of the second light beam 202 in order to fulfill the dynamic lighting functions in bends in a motorway light type function. Compared with FIGS. 2 and 3, in the motorway light function the horizontal segment 203 of the inclined part 204 will be raised with respect to the horizontal cutoff of the first light beam 201.

The lighting device according to the present invention therefore makes it possible, by virtue of the mobility of the second optical module 505, to obtain various functions with the same module and therefore reduced compactness.

In practice, in order to obtain the variations in light intensity of the first and second light beams 201 and 202, the supply current of various light sources of the first optical module 504 and second optical module 505 are preferentially made to vary. It is also possible to make the intensity of the beam vary by using several light sources, such as LEDs, which are switched on or off according to the required intensity.

The majority of the various example embodiments of the invention have been described in the context of a bend to the left for traffic on the right. The various aspects developed are obviously directly transposable to the cases of bends to the right for traffic on the right, but also transposable for bends to the right and bends to the left for traffic on the left.

While the method herein described, and the forms of apparatus for carrying this method into effect, constitute preferred embodiments of this invention, it is to be understood that the invention is not limited to this precise method and forms of apparatus, and that changes may be made in either without departing from the scope of the invention, which is defined in the appended claims.

What is claimed is:

1. A lighting device for a motor vehicle producing a light beam, said lighting device comprising a first fixed optical module comprising at least one first light source for producing a first light beam of the type consisting of a light beam with a substantially flat horizontal cutoff
   wherein said lighting device comprises a second movable optical module comprising at least one first light source for producing a second light beam with a non-flat cutoff able to be moved with respect to said first light beam.

2. The lighting device according to claim 1, wherein said at least one first light source of said second movable optical module and said at least one first light source of said first fixed optical module are of the light emitting diode type.

3. The lighting device according to claim 1, wherein said second movable optical module is able to produce a rotation movement on an approximately vertical axis when the motor vehicle is entering or passing through a bend, said rotation movement of said second movable optical module following an orientation of said bend.

4. The lighting device according to claim 1, wherein a light intensity of said first light beam is able to increase when the motor vehicle is entering or passing through a bend oriented on a side of the motor vehicle where said lighting device is disposed.

5. The lighting device according claim 4, wherein said light intensity of said first light beam is able to decrease when the motor vehicle is entering or passing through a bend oriented on a side opposite to a side of the motor vehicle where said lighting device is disposed.

6. The lighting device according to claim 1, wherein said first fixed optical module comprises a plurality of light sources, a switching on or an increase in intensity of each of said plurality of light sources being dependent on the fact that the motor vehicle is entering or passing through a bend, progressively making a global light beam more luminous on a side corresponding to an orientation of said bend, when said orientation corresponds to said side of the motor vehicle where said lighting device is disposed.

7. The lighting device according claim 6, wherein said switching on or a reduction in intensity of each of said plurality of light sources is dependent on the fact that the motor vehicle is entering or passing through a bend, progressively making said global light beam less luminous on a side corresponding to said orientation of said bend, when said orientation corresponds to a side opposite to a side of the motor vehicle where said lighting device is disposed.

8. The lighting device according to claim 1, wherein said lighting device comprises a first static light source producing a first hot spot in a global light beam, said first hot spot being oriented between an optical axis of said lighting device and a side corresponding to an external side of said lighting device, said first static light source being able to be switched on or to increase its light intensity when the motor vehicle is entering or passing through a bend oriented on a side of the motor vehicle where said lighting device is disposed.

9. The lighting device according to claim 8, wherein said first static light source is able to be switched off or to reduce its light intensity when the motor vehicle is entering or passing through a bend oriented on a side opposite to a side of the motor vehicle where said lighting device is disposed.

10. The lighting device according to claim 1, wherein said second movable optical module is able to be positioned in at least two positions, a first position according to which a global beam corresponds to a dipped or low beam for right hand traffic and a second position in which said global beam corresponds to a dipped beam for left hand traffic.

11. The lighting device according to claim 1, wherein said second movable optical module is able to be positioned so as to emit a light beam, the highest intensity zone of which is disposed on an optical axis of said lighting device and partly illuminating above a horizontal cutoff of said first light beam so as to contribute to generating a main beam.

12. The lighting device according to claim 1, wherein said second movable optical module is able to produce a rotation movement on an approximately horizontal axis in order to contribute to generating a beam of the main beam type.

13. The lighting device according to claim 1, wherein intensity of said second light beam can be modulated as an increase or decrease.

14. The lighting device according to claim 13, wherein said lighting device allows an increase in intensity of said second light beam at the same time as a reduction in intensity of said first light beam, for a function of the bad weather light type.

15. The lighting device according to claim 14, wherein said lighting device allows a decrease in intensity of said second light beam at the same time as an increase in intensity of a light source of said first light beam, for a function of the town light type.

16. The lighting device according to claim 14, wherein said second light beam contributes to the extent of at least forty percent of the total light intensity of the maximum intensity zone of a global light beam, preferentially between sixty and eighty percent of the total light intensity of the maximum intensity zone of the global light beam.

17. A motor vehicle, wherein the motor vehicle is equipped with at least one lighting device according to claim 1.

18. A method of using said lighting device or the motor vehicle according to claim 17.

19. A lighting device for a motor vehicle producing a light beam, said lighting device comprising a first fixed optical module comprising at least one first light source for producing a first light beam with a substantially flat horizontal cutoff; and
   a second movable optical module comprising at least one second module light source for producing a second light beam; said second movable optical module being adapted to be moved with respect to said first light beam in response to the motor vehicle moving around a bend in a road.

20. The lighting device according to claim 19, wherein said at least one second module light source and said at least one first light source of said first fixed optical module are of the light emitting diode type.

21. The lighting device according to claim 19, wherein said second movable optical module is able to produce a rotation movement on an approximately vertical axis when the motor vehicle is entering or passing through said bend, said rotation movement of said second movable optical module following an orientation of said bend.

22. The lighting device according to claim 19, wherein a light intensity of said first light beam is able to increase when the motor vehicle is entering or passing through said bend oriented on a side of the motor vehicle where said lighting device is disposed.

23. The lighting device according claim 22, wherein said light intensity of said first light beam is able to decrease when the motor vehicle is entering or passing through said bend oriented on a side opposite to a side of the motor vehicle where said lighting device is disposed.

24. The lighting device according to claim 19, wherein said second movable optical module is able to produce a rotation movement on an approximately horizontal axis in order to contribute to generating a main beam.

25. The lighting device according to claim 19, wherein an intensity of said second light beam can be modulated to increase or decrease in response to at least one of the motor vehicle moving in said bend or a side of the motor vehicle on which said bend is relative to a side of the motor vehicle where the lighting device is disposed.

26. The lighting device according to claim 1, wherein said at least one first light source of said second movable optical module or said at least one first light source of said first fixed optical module is of the light emitting diode type.

27. The lighting device according to claim 19, wherein said at least one second module light source or said at least one first light source of said first fixed optical module is of the light emitting diode type.

* * * * *